United States Patent Office 2,829,131
Patented Apr. 1, 1958

2,829,131

OXIDIZED BUTADIENE COPOLYMER RESINS

Frank P. Greenspan and Anthony E. Pepe, Buffalo, N. Y., assignors to Food Machinery and Chemical Corporation, San Jose, Calif.

No Drawing. Application January 23, 1956
Serial No. 560,857

5 Claims. (Cl. 260—85.1)

This invention pertains to a process of making synthetic resins and more particularly to a process of making synthetic resins useful for castings and coatings using butadiene copolymer as the raw material.

The butadiene copolymers comprise the conjugated dienes, for example butadiene and isoprene, as well as alkyl substitution products thereof, copolymerized with an ethylene monomer containing the $CH_2=CH-$ group, for example styrene and acrylonitrile, among others.

Because of their ready availability and their physical properties, butadiene copolymers are potentially useful raw materials for the production of thermoset synthetic resins. Although it is possible to use butadiene copolymers directly for making coatings, these coatings are not entirely satisfactory, usually showing lack of adhesion and lack of toughness. Particularly difficult is the production of useful castings from butadiene copolymers.

It has been found, in accordance with the present invention, that treatment of a butadiene copolymer with specific oxidizing agents followed by treating the oxidation product with a primary or secondary polyamine, permits the production of a resin which will give excellent castings or coatings which are tough, flexible and well adherent.

The process of this invention comprises a series of steps which will be more fully discussed hereinafter. In principle, a butadiene copolymer is treated in this process first with an organic peracid. The resulting oxidized product is then treated with a primary or secondary polyamine. This last treatment is carried out under conditions which are directly suitable for the production of castings or coatings. If it be desired to produce a casting, the oxidation product resulting from treating the butadiene copolymer with an organic peracid is mixed with a suitable primary or secondary polyamine and the mixture then poured into a mold. Upon heating, the mixture will then set to a hard, tough and usually light-colored cast resin.

If it be desired to form a coating, the oxidation product obtained by treating the butadiene copolymer with an organic peracid is mixed in solvent solution with a suitable primary or secondary polyamine and this solvent mixture then applied to the surface to be coated and the coating heated. Upon evaporation of the solvent, a tough, flexible and strongly adherent coating is then obtained.

Butadiene copolymers generally can be used as the raw material in the process of this invention. Production of useful oxidized butadiene copolymers, in the sense of this invention, requires a starting material of a certain minimum chain length, i. e., degree of polymerization. No theoretical upper limit exists for the chain length of the unsaturated starting material to be oxidized in accordance with this invention. However, there are certain practical considerations which impose a limit on the degree of polymerization of the starting material. Because the oxidation reaction has to be carried out in the liquid phase, the starting material must either be a liquid or must be soluble in a suitable reaction medium. Many highly polymerized compounds are solids of little or no solubility in otherwise useful solvents and in this respect, a practical upper limit is imposed on the degree of polymerization of the starting material. In other words, the practical requirement imposed by the need of working in the liquid phase, limits the choice of starting material. However, the degree of polymerization of the starting material will also have to be considered in connection with the properties desired in the oxidized product. A highly polymerized starting material will produce an oxidized product of somewhat different properties than would be obtained by the use of a starting material of a lower degree of polymerization.

The oxidation of the butadiene copolymer is carried out in accordance with this invention by treating it with an organic peracid. Although organic peracids soluble in the reaction medium or in the butadiene copolymer can be generally used, we prefer to employ the lower aliphatic peracids, peracetic acid or performic acid. The oxidation reaction may be carried out using a preformed peracid or the peracid may be formed from its constituents during the oxidation reaction and in the reaction medium.

When oxidizing the butadiene copolymer with the organic peracid, stoichiometric amounts of the peracid may be used or amounts below that theoretically required completely to oxidize the double bonds present in the butadiene copolymer. In the following examples, butadiene copolymers treated with the stoichiometric amount of peracid will be designated as "100% oxidized." Butadiene copolymers oxidized with reduced amounts of peracid will be designated by a percent figure to indicate what might be termed the degree of oxidation in terms of the fraction of the theoretical amount of peracid used. The reactivity and resin forming properties of the oxidized butadiene copolymers will obviously vary with their degree of oxidation. Generally speaking, a 100% oxidized butadiene copolylmer will be more reactive and will more readily form a casting or coating resin than a butadiene copolymer oxidized to a lesser extent. At the same time, the properties of the finished casting or coating will also be influenced to an extent by the degree of the oxidation of the butadiene copolymer.

As indicated above, the oxidized butadiene copolymer is subsequently treated with a primary or secondary polyamine. Examples of polyamines which may be used in the process of this invention are: methyl piperazine, dimethyl piperazine, propylene diamine, diethylene triamine, tetraethylene pentamine, m-phenylene diamine, iminobis-propylamine, triethylene tetramine and others. Certain limitations on the choice of such polyamines are, however, imposed by the practical process requirements. If casting resins are to be produced, the oxidized butadiene copolymer has to be mixed with the polyamine before casting and heating. To permit proper mixing, the two main reactants, the oxidized butadiene copolymer and the polyamine should be liquid. Therefore, in the case of casting resins, the polyamines should be those liquid at ordinary temperature or those which possess a relatively low melting point to permit mixing at room temperature or somewhat elevated temperature. In the case of coating resins, a solvent is invariably used from which the coating is then obtained by evaporation. In this case, the polyamines used are those soluble in the solvent from which the coating is to be made.

The amount of primary or secondary polyamine to be used for treating the oxidized butadiene copolymer depends on the degree of oxidation of the butadiene copolymer and the particular polyamine used. Generally speaking, one equivalent weight of oxidized butadiene copolymer, that is, the weight of butadiene copolymer containing 16 g. of oxirane oxygen, is treated with one equivalent weight of the polyamine. The equivalent weight of the polyamine is here defined as the molecular weight of the polyamine divided by the number of primary or secondary amino groups in the polyamine. The amount of polyamine calculated in this way represents the theoretical amount for complete reaction with one equivalent weight of the oxidized butadiene copolymer. For example, if a sample of oxidized butadiene copolymer is found by analysis to contain 6.6 g. of oxirane oxygen per 100 grams of product, the equivalent weight of the product will then be $$\frac{100 \times 16}{6.6}$$

or 242 grams. If this product is to be treated with, e. g. m-phenylene diamine, calculation shows that the equivalent weight of this polyamine is $$\frac{108}{2}$$

or 54 gram. The theoretical amount of m-phenylene diamine to be used with this particular oxidized butadiene copolymer would then be $$\frac{54}{242}$$

or 0.222 gram of this particular oxidized polybutadiene copolymer.

In accordance with this invention, 100% of the calculated theoretical amount of primary or secondary polyamine need not always be used in the production of the new casting or coating resins of this invention, as good casting or coating resins may be made with the amine as low as 10% of the theoretical.

The following examples will illustrate in some detail the principles of this invention. In Example 1, in particular, the process will be described in full detail.

*Example 1*

200 g. of a liquid butadiene-styrene copolymer containing approximately 70 parts of butadiene and 30 parts of styrene having a viscosity of 1500 cps. at 100° F. were dissolved in 250 g. of toluene. To this solution was added 57.0 g. of glacial acetic acid and 45.0 g. of sulfonic acid type cation exchange resin. The mixture was heated to about 65 to 70° C. and maintained at this temperature. Then 80.9 g. of hydrogen peroxide 50% was added over a period of 45 minutes. This amount of hydrogen peroxide corresponds to about 50% of the stoichiometric amount required fully to oxidize the butadiene copolymer. After an additional 4½ hours at 65 to 70° C., the reaction was complete and the oxidized butadiene copolymer recovered by vacuum drying after washing with water and then with aqueous solution of potassium hydroxide. The resulting product was analyzed and found to contain 6.67% oxirane oxygen which was determined by an analytical procedure corresponding essentially to that of Swern et al., described in Analytical Chemistry, 19, 404 (1947).

To 10 g. of this product was then added 1.56 g. of tetraethylene pentamine, the mixture poured into a mold and baked for 4 hours at 140 to 150° C. After cooling and removal from the mold, a hard and tough thermoset casting was obtained.

*Example 2*

Another sample of the same liquid butadiene-styrene copolymer was oxidized with acetic acid and hydrogen peroxide as described in Example 1. Reaction time was only 2½ hours and the product, upon analysis, showed an oxirane oxygen content of 5.5%.

10 g. of this product was then mixed with 1.8 g. of diethylene triamine. The mixture was then poured into a mold and baked for 2 hours at 140 to 150° C. After cooling and removal from the mold, a hard and tough thermoset casting was obtained.

*Example 3*

Another sample of the same liquid butadiene-styrene copolymer was oxidized as described in Example 2. The product, upon analysis, showed an oxirane oxygen content of 5.5%.

10 g. of this product was then mixed with 1.25 g. of triethylene tetramine. This mixture was poured into a mold and baked for 2 hours at 140 to 150° C. After cooling and removal from the mold, a tough thermoset casting was obtained.

*Example 4*

400 g. of the same liquid butadiene-styrene copolymer was dissolved in 400 g. of toluene and to this was added 40.7 g. of sodium acetate and 2.0 g. of dipicolinic acid, to adjust the pH and to stabilize the reaction mixture. To this mixture was added slowly, over a period of 40 minutes, 939 g. of 40% peracetic acid and the mixture maintained for a total reaction time of 220 minutes at about 30° C. This amount of peracetic acid corresponds to about 100% of the stoichiometric amount required to fully oxidize the polybutadiene copolymer. After recovery as described in Example 1, the product was analyzed and found to contain 6.33% oxirane oxygen.

To 10 g. of the product was then added 1.88 g. of 3.3'-iminobis-propylamine. The mixture was poured into a mold and baked for 2 hours at about 150° C. After cooling and removal from the mold, a hard and tough casting was obtained.

*Example 5*

Another sample of the same liquid butadiene-styrene copolymer was oxidized as described in Example 4, and found to contain 6.5% oxirane oxygen.

To 10 g. of this product was then added 2.03 g. of 2-methyl piperazine. This mixture was then poured into a mold and baked for 16 hours at 140 to 150° C. After cooling and removal from the mold, a tough casting was obtained.

*Example 6*

Another sample of the same liquid butadiene-styrene copolymer was oxidized as described in Example 1, but the amount of hydrogen peroxide used corresponded to only 35% of the stoichiometric amount required to fully oxidize the polybutadiene copolymer. Analysis showed that the product contained 4.0% oxirane oxygen.

To 10 g. of this product was then added 0.93 g. of triethylene tetramine. The mixture was then poured into a mold and baked for 3 hours at 140 to 150° C. After cooling and removal from the mold, a tough, rubbery casting was obtained.

*Example 7*

Another sample of the same liquid butadiene-styrene copolymer was oxidized as described in Example 5 but the amount of peracetic acid used corresponded to only about 20% of the stoichiometric amount required fully to oxidize the polybutadiene copolymer. The product was found to contain 3.2% oxirane oxygen.

To 10 g. of this product was added 0.87 g. of 3,3'-iminobis-propylamine. The mixture was then poured into a mold and baked for 16 hours at 140 to 150° C. After cooling and removal from the mold, a rubbery solid was obtained.

*Example 8*

It is possible to catalyze the reaction of oxidized butadiene copolymers with polyamines by use of phenols. This can be accomplished in various ways, very readily, for instance, by introducing a minor quantity of phenol into the mixture. As shown in the following example, phenol addition will produce, under the same conditions, a faster reaction than otherwise obtained.

Another sample of the same liquid butadiene-styrene copolymer was oxidized as described in Example 1 and showed on analysis an oxirane oxygen content of 5.5%.

To 10 g. of this product was then added 1.25 g. of triethylene tetramine and approximately 0.4 g. of phenol. The mixture was then poured into a mold and baked for 2 hours at 140 to 150° C. After cooling and removal from the mold, a hard casting with a Barcol hardness of about 75 was obtained.

In a parallel test, 10 g. of the product mixed with 1.25 g. of triethylene tetramine without the addition of phenol was cured in the same manner for the same time and at the same temperature. After cooling and removal from the mold, a tough casting was obtained with a Barcol hardness of about 58.

Example 9

300 g. of another sample of the liquid butadiene-styrene copolymer described in Example 1 was dissolved in 450 g. of toluene and then was added 45 g. of 90% formic acid. To this mixture, which was maintained at about 60 to 65° C., was then added slowly, over a period of about 45 minutes, 120.6 g. of 50% hydrogen peroxide. This amount of hydrogen peroxide corresponds to about 50% of the stoichiometric amount required to oxidize the polybutadiene copolymer completely. The reaction was complete after an additional 4 hours at 60 to 65° C. After washing and recovery, as described in Example 1, the product was analyzed and found to contain 6.0% oxirane oxygen.

10 g. of the product was then mixed with 1.69 g. of 3,3'-iminobis-propylamine and about .4 g. of phenol. This mixture was poured into a mold and baked for 4 hours at 140 to 150° C. After cooling and removal from the mold, a hard and tough casting was obtained.

Example 10

300 g. of a liquid copolymer of 73 parts of butadiene and 27 parts of acrylonitrile were dissolved in 300 g. of toluene and to this mixture was added 20 g. of sodium acetate and 0.9 g. of dipicolinic acid. Thereafter was added slowly, over a period of 60 minutes, 391 g. of 40% peracetic acid and the mixture maintained for a total reaction time of 340 minutes at about 25° C. After washing and recovery, the product was found to contain 5.67% oxirane oxygen.

10 g. of this product was then mixed with 1.5 g. of 3,3'-iminobis-propylamine and the mixture poured into a mold and baked for 3 hours at 140 to 150° C. After cooling and removal from the mold, a hard, tough thermoset casting was obtained.

Example 11

50 g. of a liquid copolymer of 86 parts of butadiene and 14 parts of styrene were oxidized with peracetic acid as described in Example 10. After recovery, the product was found to contain 7.8% oxirane oxygen.

10 g. of this product was then mixed with 2.64 g. of m-phenylene diamine and about 0.4 g. of phenol. The mixture was then poured into a mold and baked for 5 hours at 140 to 150° C. After cooling and removal from the mold, a hard, tough casting was obtained.

Example 12

200 g. of a solid copolymer of 15 parts isoprene, 15 parts of acrylonitrile, and 70 parts styrene were oxidized in the manner described in Example 4. The resulting product was then dissolved in toluene resulting in a solution containing 25 g. of product per 100 ml. of solution. Analysis showed that the product contained 2.08% oxirane oxygen. Part of the solvent solution of the product was then dosed with triethylene tetramine in an amount corresponding to 0.048 g. of triethylene tetramine per gram of solids in the solution. Thereafter, a glass plate was uniformly coated with the solution and baked for one hour at 150° C. The thermoset coating obtained after removal from the oven was found to be hard and tough and showed very good adhesion to the glass.

Example 13

200 grams of a liquid copolymer of 70-30 butadiene-styrene was dissolved in 250 grams of toluene, and to this mixture was added 10 grams of sodium acetate. Thereafter was added slowly, over 60 minutes, 392 grams of 40% peracetic acid and the mixture was maintained for a total reaction time of 315 minutes at a temperature of about 50° C. After washing and recovery, the product was found to contain 7.13% oxirane oxygen.

10 grams of this product was then mixed with 0.2 grams of 3,3'-iminobis-propylamine and 0.40 gram of 4% phenol. This mixture then was poured into a mold and baked overnight at 140° C. After cooling and removal from the mold, a tough casting having a Barcol hardness of 50 was obtained.

Example 14

10 grams of the same oxidized butadiene-styrene copolymer was reacted with 1.0 gram of 3,3'-iminobis-propylamine in the presence of 0.40 gram of 4% phenol, by the casting procedure described in the previous example. In this case a tough casting having a Barcol hardness of 90 was obtained.

What is claimed is:

1. A method for the production of thermoset resins which comprises epoxidizing a copolymer of a conjugated diene and an ethylene monomer containing the $CH_2=CH-$ group with an amount of a liquid lower aliphatic peracid corresponding to at least 30% of the amount required to epoxidize all double bonds present in said polybutadiene copolymer and then reacting the thus epoxidized butadiene copolymer with a compound selected from the group consisting of primary and secondary polyamines in an amount corresponding to at least 10% of the amount required for complete reaction with the epoxidized butadiene copolymer.

2. The method of claim 1 in which the lower aliphatic peracid is peracetic acid.

3. The method of claim 1 in which the lower aliphatic peracid is performic acid.

4. The method according to claim 1 wherein a small amount of phenoxide ion is present during the reaction of the amine and the epoxidized polybutadiene copolymer.

5. As a new composition of matter, a thermoset resin produced by the method of claim 1.

References Cited in the file of this patent

UNITED STATES PATENTS 2,660,563    Banes et al. _____ Nov. 24, 1953